(12) United States Patent
Langmans et al.

(10) Patent No.: US 8,731,274 B2
(45) Date of Patent: May 20, 2014

(54) METHOD AND SYSTEM FOR WAFER REGISTRATION

(75) Inventors: Eldad Langmans, Haifa (IL); Shimon Koren, Haifa (IL)

(73) Assignee: CamTek Ltd., Migdal Haemek (IL)

( * ) Notice: Subject to any disclaimer, the term of this patent is extended or adjusted under 35 U.S.C. 154(b) by 208 days.

(21) Appl. No.: 13/083,561

(22) Filed: Apr. 10, 2011

(65) Prior Publication Data

US 2012/0195490 A1 Aug. 2, 2012

Related U.S. Application Data

(60) Provisional application No. 61/322,856, filed on Apr. 11, 2010.

(51) Int. Cl.
  *G06K 9/00* (2006.01)
(52) U.S. Cl.
  USPC .......................................... 382/149; 382/145
(58) Field of Classification Search
  USPC ......... 382/100, 108, 109, 141, 142, 143, 144, 382/145, 147, 149, 150, 151, 152; 356/399, 356/401; 438/959; 451/5; 204/298.15; 156/345.22; 257/E25.013, E25.023
  See application file for complete search history.

(56) References Cited

U.S. PATENT DOCUMENTS

| | | | | |
|---|---|---|---|---|
| 4,618,938 A * | 10/1986 | Sandland et al. | ............. | 382/148 |
| 6,738,503 B1 * | 5/2004 | Sakaue et al. | ................. | 382/145 |
| 6,751,361 B1 * | 6/2004 | Wagman | ...................... | 382/287 |
| 6,906,794 B2 * | 6/2005 | Tsuji | .......................... | 356/237.4 |
| 6,957,154 B2 * | 10/2005 | Steele et al. | .................... | 702/35 |
| 7,379,826 B2 * | 5/2008 | Steele et al. | .................... | 702/35 |
| 7,508,504 B2 * | 3/2009 | Jin et al. | ..................... | 356/237.4 |
| 7,684,611 B2 * | 3/2010 | Simpkins | ...................... | 382/145 |
| 7,957,118 B2 * | 6/2011 | Chang et al. | .................. | 361/234 |
| 8,055,056 B2 * | 11/2011 | Kim et al. | ...................... | 382/141 |
| 8,309,919 B2 * | 11/2012 | Obara et al. | .................. | 250/306 |
| 8,426,223 B2 * | 4/2013 | Voges et al. | ....................... | 438/7 |
| 8,492,178 B2 * | 7/2013 | Carlson et al. | .................. | 438/22 |
| 2001/0024877 A1 * | 9/2001 | Vepa et al. | .................... | 438/691 |

\* cited by examiner

*Primary Examiner* — Sheela Chawan
(74) *Attorney, Agent, or Firm* — Oren Reches

(57) ABSTRACT

A method for wafer registration, the method may include: moving a wafer by an X-Y stage and acquiring wafer edge area images; and processing the wafer edge area images to locate an edge of the wafer. A system that includes a camera, an X-Y stage for moving a wafer; wherein the camera is arranged to acquire wafer edge area images; and a processor that is arranged to process the wafer edge area images to locate an edge of the wafer.

10 Claims, 14 Drawing Sheets

METHOD AND SYSTEM FOR WAFER REGISTRATION

RELATED APPLICATIONS

This Application claims priority from U.S. provisional patent Ser. No. 61/322,856 filing date Apr. 11, 2010 which is incorporated herein by reference.

BACKGROUND OF THE INVENTION

Most of the known wafer top near edge inspection and metrology systems utilize propriety, dedicated scanning stage (usually R/T type) and a camera located at approximate known location of the wafer edge.

FIG. 1 illustrates a prior art chuck 10. The chuck 10 has an upper surface that is made of a non-reflective material and does not provide a proper contrast to the edge of a wafer that is placed on the chuck. FIG. 1 illustrates the chuck as including as array of vacuum openings and a recess 12 for receiving a wafer interface.

FIG. 2 illustrates a cross sectional view of a prior art wafer 20. While FIG. 2 illustrates a relatively ordered wafer edge that includes linear surfaces—in practice the edge surface is usually deformed. FIG. 2 illustrates an edge surface 21, top bevel surface 22, low bevel surface 23, upper and lower surfaces 24 and 25 as well as two layers 28 and 29 that are positioned above each other and have different reflective indexes. The first layer 28 can be relatively bright while the second layer 29 can be relatively dark.

Most of the inspection systems are dedicated for wafer edge inspection only.

Other wafer inspection and metrology systems are mainly intended for patterned wafer area inspection—an area with a well defined periodic pattern (field/dice). The inspection area and an applicable algorithm is explicitly defined by user with respect to single field/die geometry and then repetitively applied to all existing fields/dice.

The partial pattern and additionally or alternatively, un-patterned wafer edge areas do not exhibit previously mentioned geometry.

Therefore, the patterned wafer area inspection system and methods (algorithms) can not be applied per se to the wafer edge due to the undefined geometry of the edge. Moreover, since the wafer edge geometry varies for each wafer, the mentioned geometry can not be trained.

Most of the wafer inspection systems are using dedicated pre-aligning systems to define wafer notch/flat orientation. Pre-aligning systems, mostly integrated with wafer handling robotics are time consuming with respect to overall wafer inspection cycle.

SUMMARY

A method for wafer registration, the method may include: moving a wafer by an X-Y stage and acquiring wafer edge area images; and processing the wafer edge area images to locate an edge of the wafer.

The method may include detecting a notch or a line of the edge of the wafer.

The method may include determining a wafer alignment based on at least one of a location of the edge of the wafer and a shape of the edge of the wafer.

The method may include defining an expected location of at least one wafer layer edge based on a location of the edge of the wafer.

The method may include placing the wafer on a chuck that may include a reflective element that is positioned such that an inner portion of the reflective element is concealed by at least the edge of the wafer and an outer portion of the reflective element is non-concealed by the wafer.

The reflective element may be a mirror.

The method may include processing the wafer edge area images to locate at least one wafer layer edge that is proximate to the edge of the wafer and differs from the edge of the layer.

The method may include detecting at least one of the edge of the wafer and the wafer layer edge by performing at least one out of: iterative application of edge driven cross bilateral filtering combined with grayscale morphologic operators; and application of differential operators including but not limited to convolution kernel operations and morphologic derivatives.

The method may include detecting at least one of the edge of the wafer and the wafer layer edge by at least one of: extraction of edges vector data including configurable segmentation of continues edges according to edge directional information, fluctuation severity and intersections; and merging broken edge segments into a combined edge segment including polar interpolation and extrapolation in the gap areas.

The method may include detecting at least one of the edge of the wafer and the wafer layer edge by applying a randomized Hough transform, with culling of low probability outliers; and interpolating gap areas between edge segments using a polar interpolation based on the emerging circular\elliptic solution.

The method may include sending information about a location of the edge of the wafer and a location of the least one wafer layer edge to an inspection system.

The method may include sending information about a location of the edge of the wafer and a location of the least one wafer layer edge to a metrology system.

The method may include obtaining wafer edge area images of different resolution; and processing the edge area images of the different resolution to locate an edge of the wafer.

The method may include obtaining by the camera non-edge areas images, wherein non-edge areas images are images of areas that differ from wafer edge areas; and processing the non-edge areas images to detect defects.

The method may include sending wafer edge information about a location of the edge of the wafer to an inspection system.

The method may include sending wafer edge information about a location of the edge of the wafer to a metrology system.

A method, comprising: moving a wafer, by an X-Y stage, while acquiring wafer edge area images; and processing the wafer edge area images to locate an edge of the wafer and to provide information related to a metrology process or to an inspection process or both. Thus the processing can be utilized for registration and for other purposes.

The method may include defining areas of interest based on a location of the edge of the wafer.

The method may include defining areas of interest based on a location of the edge of the wafer and an expected location of a wafer layer edge that differs from the edge of the wafer.

The method may include associating a processing algorithm for each area of interest, wherein at least two areas of interest are associated with different processing algorithms.

The method wherein at least one processing algorithm is an inspection process.

The at least one processing algorithm is a metrology process.

The method may include applying a metrology process on information obtained from the wafer edge area images.

The method may include applying an inspection process on information obtained from the wafer edge area images.

The method may include obtaining by the camera wafer non-edge area images; and processing the wafer non-edge area images to detect defects.

A system, that may include: a camera; an X-Y stage for moving a wafer; wherein the camera may be arranged to acquire wafer edge area images; and a processor that may be arranged to process the wafer edge area images to locate an edge of the wafer.

The processor may be arranged to detect a notch or a line of the edge of the wafer.

The processor may be arranged to determine a wafer alignment based on at least one of a location of the edge of the wafer and a shape of the edge of the wafer.

The processor may be arranged to define an expected location of at least one wafer layer edge based on a location of the edge of the wafer.

The system may include a chuck that may include a reflective element that is positioned such that an inner portion of the reflective element is concealed by at least the edge of the wafer and an outer portion of the reflective element is non-concealed by the wafer.

The reflective element is a mirror.

The processor may be arranged to process the wafer edge area images to locate at least one wafer layer edge that is proximate to the edge of the wafer and differs from the edge of the layer.

The processor may be arranged to detect at least one of the edge of the wafer and the wafer layer edge by performing at least one out of: iterative application of edge driven cross bilateral filtering combined with grayscale morphologic operators; and application of differential operators including but not limited to convolution kernel operations and morphologic derivatives.

The processor may be arranged to detect at least one of the edge of the wafer and the wafer layer edge by at least one of: extraction of edges vector data including configurable segmentation of continues edges according to edge directional information, fluctuation severity and intersections; and merging broken edge segments into a combined edge segment including polar interpolation and extrapolation in the gap areas.

The processor may be arranged to detect at least one of the edge of the wafer and the wafer layer edge by applying a randomized Hough transform, with culling of low probability outliers; and interpolating gap areas between edge segments using a polar interpolation based on the emerging circular\elliptic solution.

The processor may be arranged to send information about a location of the edge of the wafer and a location of the least one wafer layer edge to an inspection system.

The processor may be arranged to send information about a location of the edge of the wafer and a location of the least one wafer layer edge to a metrology system.

The processor may be arranged to obtain wafer edge area images of different resolution; and processing the edge area images of the different resolution to locate an edge of the wafer.

The processor may be arranged to obtain wafer edge area images of different resolution; and processing the edge area images of the different resolution to locate an edge of the wafer.

The camera may be arranged to obtain non-edge areas images, wherein non-edge areas images are images of areas that differ from wafer edge areas; and wherein the processor may be arranged to process the non-edge areas images to detect defects.

The processor may be arranged to send wafer edge information about a location of the edge of the wafer to an inspection system.

The processor may be arranged to send wafer edge information about a location of the edge of the wafer to a metrology system.

The processor may be arranged to define areas of interest based on a location of the edge of the wafer.

The processor may be arranged to define areas of interest based on a location of the edge of the wafer and an expected location of a wafer layer edge that differs from the edge of the wafer.

The processor may be arranged to associate a processing algorithm for each area of interest, wherein at least two areas of interest are associated with different processing algorithms.

The at least one processing algorithm is an inspection process.

The at least one processing algorithm is a metrology process.

The processor may be arranged to apply a metrology process on information obtained from the wafer edge area images.

The processor may be arranged to apply an inspection process on information obtained from the wafer edge area images.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
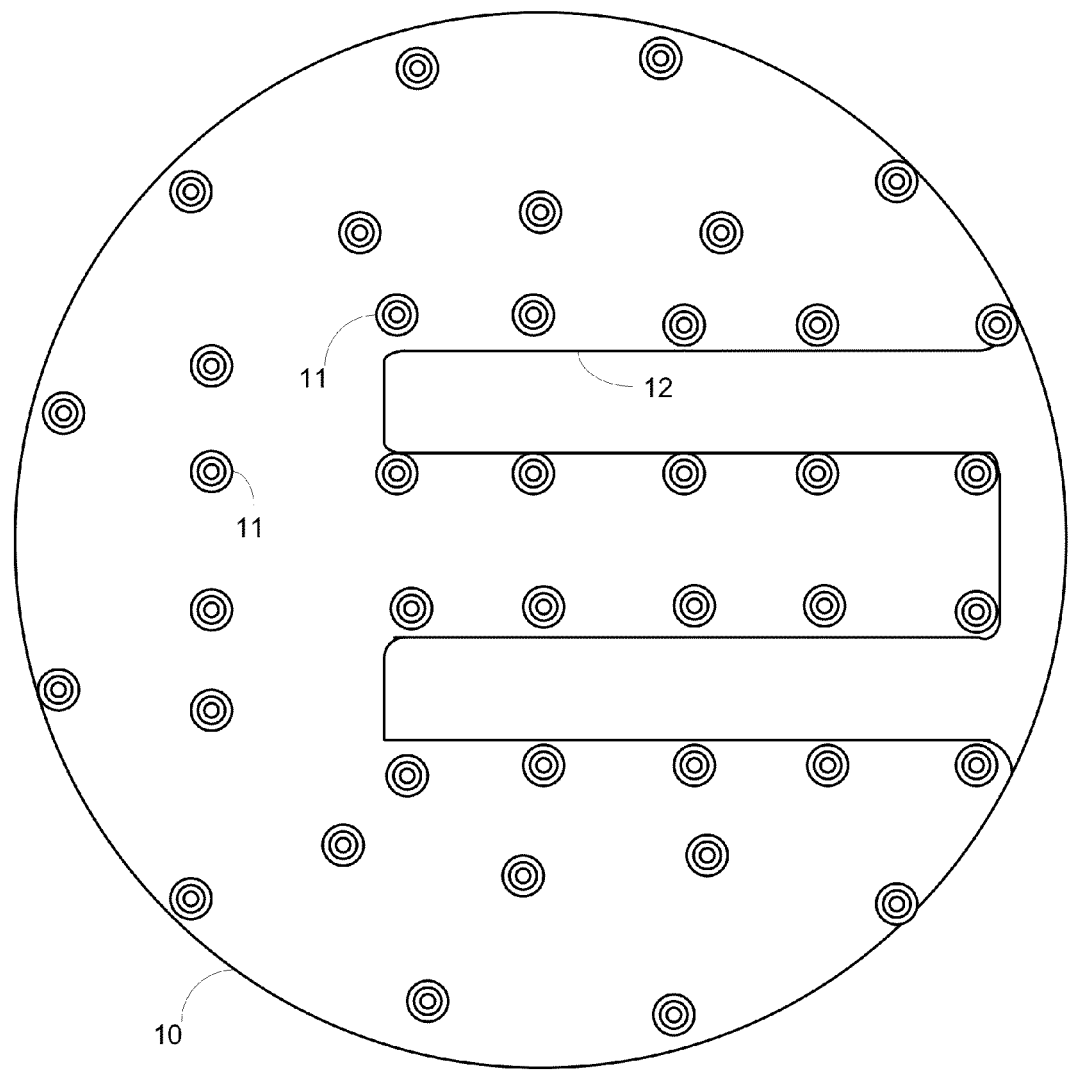
FIG. 1 illustrates a prior art chuck.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

According to an embodiment of the invention the edge of the wafer is imaged and afterwards detected by utilizing a system that includes a X-Y stage and by using the same optical elements that are used for imaging wafer non-edge areas—areas of the wafer that differ from wafer edge areas. This is in contrary to prior art solutions that used a dedicated camera for wafer edge inspection and at least one other camera for imaging other areas (regions) of the wafer. Yet according to another embodiment of the invention the same optical elements are also used for wafer alignment and wafer edge registration.

According to an embodiment of the invention a chuck is provided. The chuck may include a reflective element such as a reflective "skirt" mounted below the wafer (once the wafer is positioned on the chuck) and allows clear wafer edge imaging. The reflective element may be positioned such as to contact the wafer (aligned with the upper surface of the chuck) or may be positioned at a different height (for example—slightly below the supper surface of the chuck).

According to various embodiments of the invention there is provided a method and a system for performing a wafer edge inspection in addition to wafer inspection and metrology with minor hardware modification.

According to an embodiment of the invention there is no need in a dedicated camera. The same camera used for entire wafer surface inspection and metrology can be used for wafer notch/flat orientation detection and wafer edge area inspection and metrology.

According to an embodiment of the invention there is no need in a dedicated pre-aligning system and procedure required for wafer notch/flat orientation detection.

According to an embodiment of the invention there is no need in a dedicated stage for wafer edge inspection. Wafer edge area inspection and metrology may be performed as a part of entire wafer surface inspection and metrology, by extending X-Y range of the X-Y stage.

There is a need to define areas of interest (regions of interest) in wafer edge area images. Wafer edge area images, in contrary to wafer non-edge areas include images of areas that do not belong to the wafer. In addition—wafer edge area images taken of different portions of the edge of the wafer may differ from each other by the location of the areas of interest. For example—a wafer edge area image taken from the upper portion of the wafer will include an irrelevant area at its upper part—while a wafer edge area image taken from the lower portion of the wafer will include an irrelevant area at its lower part. Thus when applying detection processing algorithms such as die to die or die to reference these difference should be taken into account. The edge of the wafer and of various top layers should be circular but is typically deformed—thus further complicating the detections of areas of interest. This is illustrated, for example, in wafer edge area images 42(6) and 42(7) of FIG. 12.

According to various embodiments of the invention once the edge of the wafer is detected the location of wafer layer edges (that differ from the edge of the wafer) may be either located or estimated. For example, a predefined distance can be assumed to exist between the edge of the wafer and wafer layer edges. The estimation can be also be affected by previously detected wafer layer edges, to previous inspection or metrology results and the like.

Chuck

Figure 3:
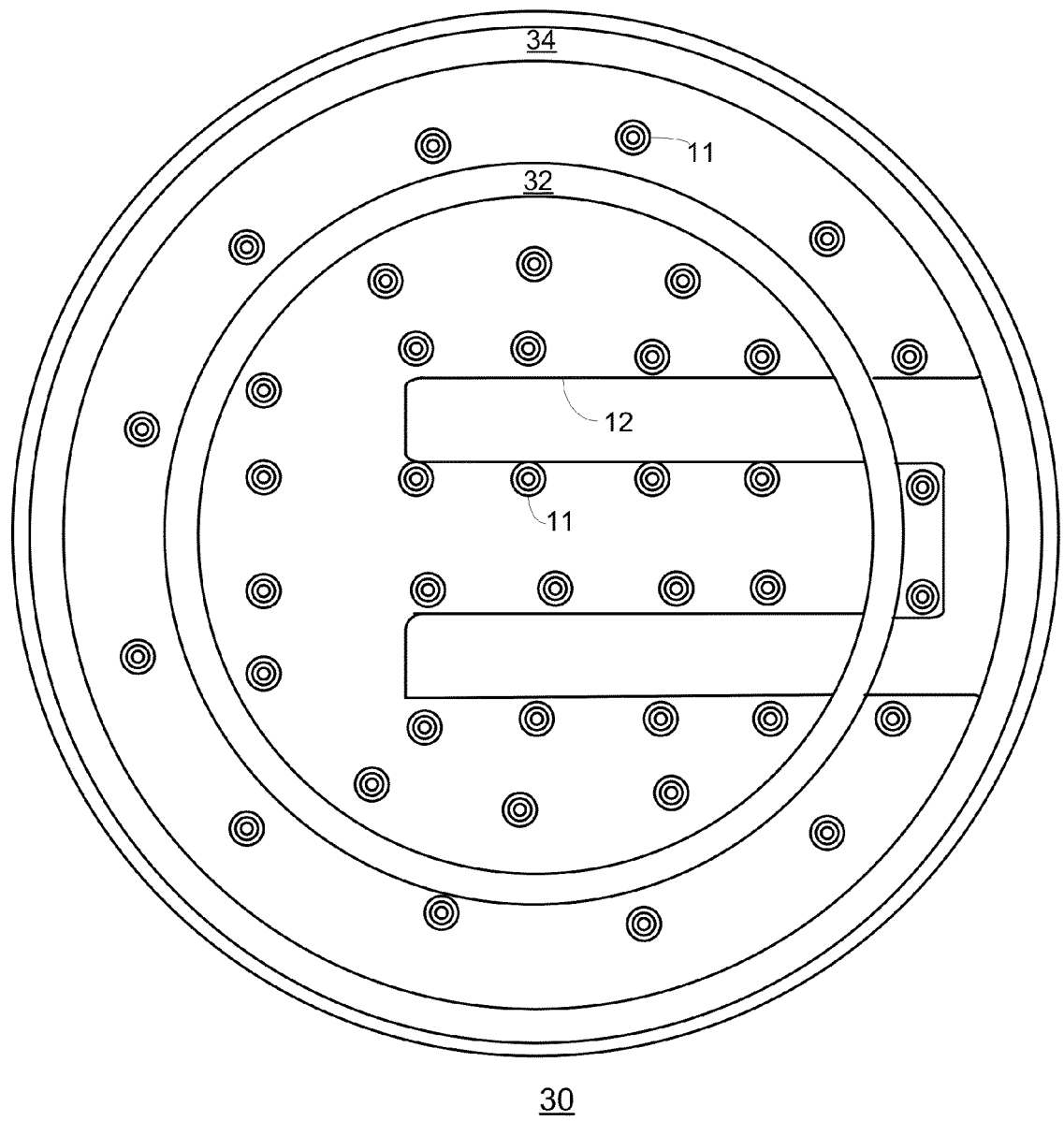
FIGS. 3 and 4 illustrate a chuck according to various embodiments of the invention.
Figure 4:
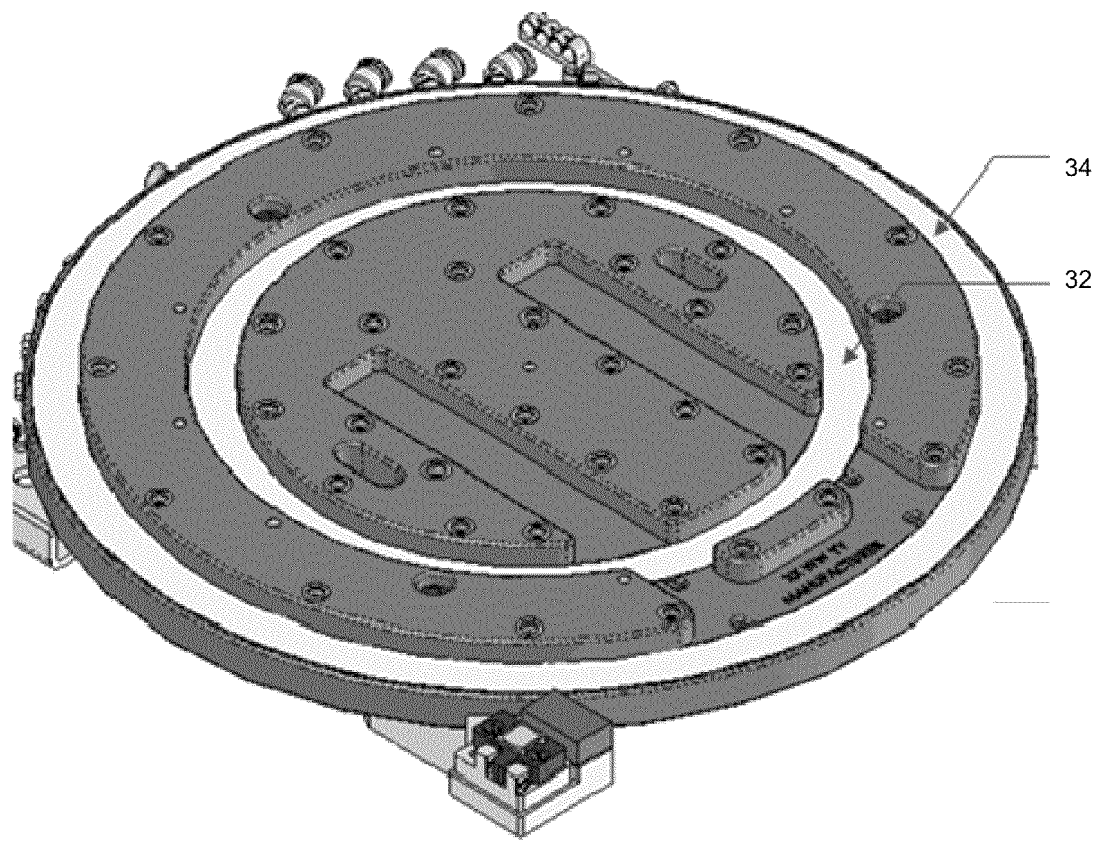

FIGS. 3 and 4 illustrate a chuck 30 according to an embodiment of the invention. Chuck 30 includes two spaced apart reflective elements 32 and 34 that are positioned such as to provide a reflective background to edges of 200 mm wafers and 300 mm wafers respectfully.

A first reflective element 32 is a ring that has an inner radius that is smaller than 200 mm and an outer radius that is larger than 200 mm.

A second reflective element 34 is a ring that has an inner radius that is smaller than 200 mm and an outer radius that is larger than 300 mm.

Registration Scan

According to an embodiment of the invention a registration scan is executed and it may enable a dynamic wafer edge layers registration and tracing.

The registration scan may be executed by using an X-Y stage and an area camera. The area camera may be also used for inspection of areas of the wafer that differ from edge areas of the wafer.

The registration scan may include a correlated X-Y motion that approximates a circular route which is derived from an estimated wafer center, known wafer diameter and user defined area of interest from wafer apex. Thus, the expected location of the wafer edge is images by a sequence of images that are acquired by utilizing an x-y stage.

An area camera (such as camera 1010 of FIG. 14) acquires sequence of images referred to as wafer edge area images 42. These wafer edge area images 42 include images of the edge of the wafer as well as additional areas of the wafer and the chuck. The size of the area included in each wafer edge image 42 can be defined by the user but this is not necessarily so. Typically, an area that is much larger that the edge of the wafer and its close vicinity is imaged.

Figure 5:
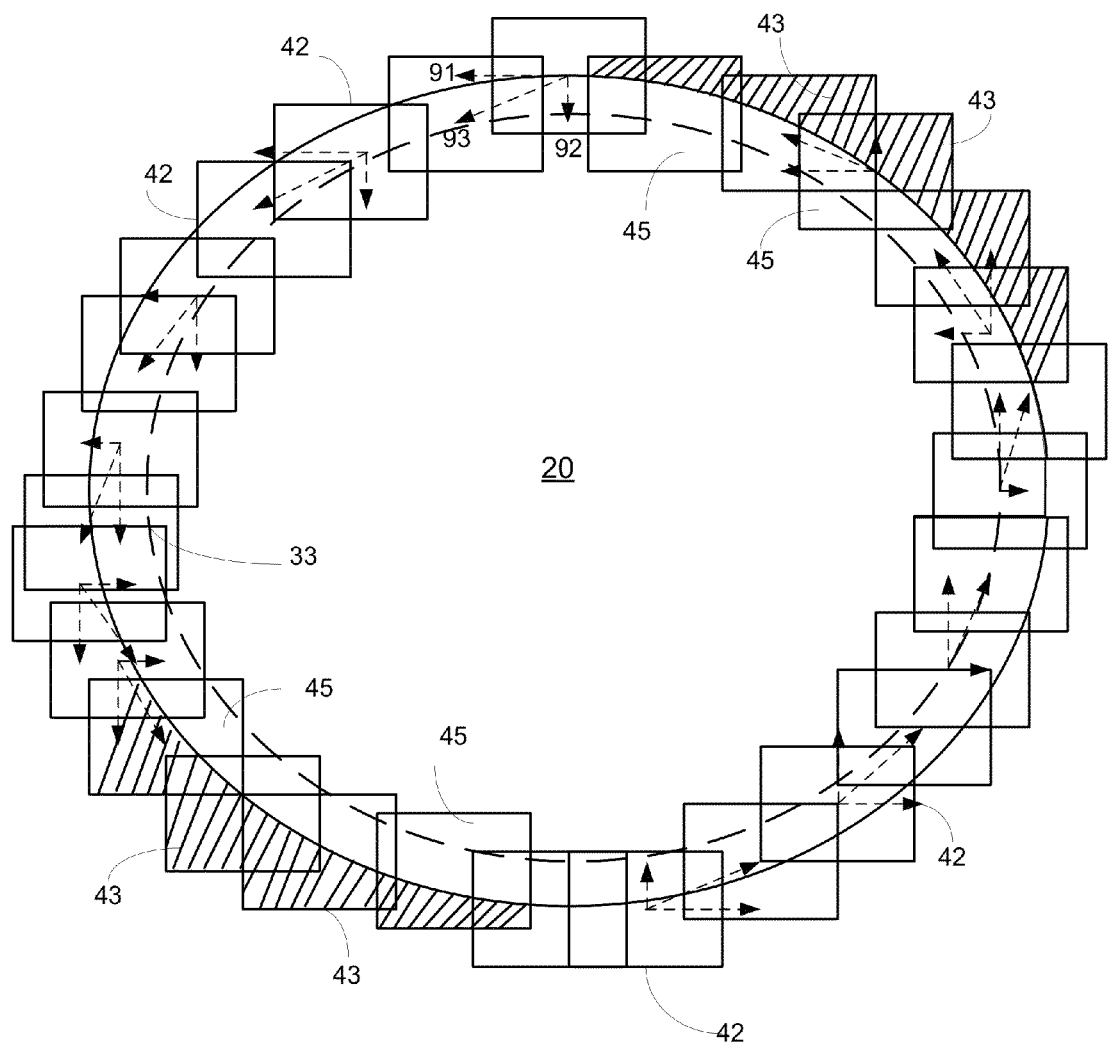
FIG. 5 illustrates a circular X-Y registration and alignment scan according to an embodiment of the invention.

FIG. 5 illustrates a wafer 30 and multiple wafer edge area images 42 acquired during the registration scan. These wafer edge area images 42 can be acquired at random, run-time calculated intervals so user defined area of interest may be fully covered over a 27c sector. The wafer edge area images 42 may overlap. Each wafer edge area image 42 can include an image portion 45 of a wafer edge area and an image portion 43 of the surroundings of the wafer 30. The surrounding may include the reflective element and may also include a non-reflective portion of the upper surface of the chuck 30.

The wafer edge area images 42 can be processed to detect the orientation of the wafer by detecting a notch or flat of the wafer. The location of the edge of the wafer also provides wafer position information.

The detection of the notch or flat can implemented by such means as deviation from circularity and pattern matching techniques including but not limited to normalized correlation and geometric model finding. The edge of the wafer is expected to be circular and a flat (or a notch) provides a major deviation from this circular shape.

FIG. 5 also illustrates the linear movements introduced during the acquisition of wafer edge area images 42. Dashed line triplets illustrate the X-axis motion, the Y-axis motion and the combination of these two movements. For example, an X-axis movement is illustrated by dashed arrow 91, a Y-axis movement is illustrated by dashed arrow 92 and an overall movement (combination of X and Y axis movements) is illustrated by dashed arrow 93.

FIG. 5 illustrates an area of interest that has an annular shape that is defined between the edge of the wafer 30 and inner circle 33. This area of interest may define the wafer edge areas.

Figure 6:
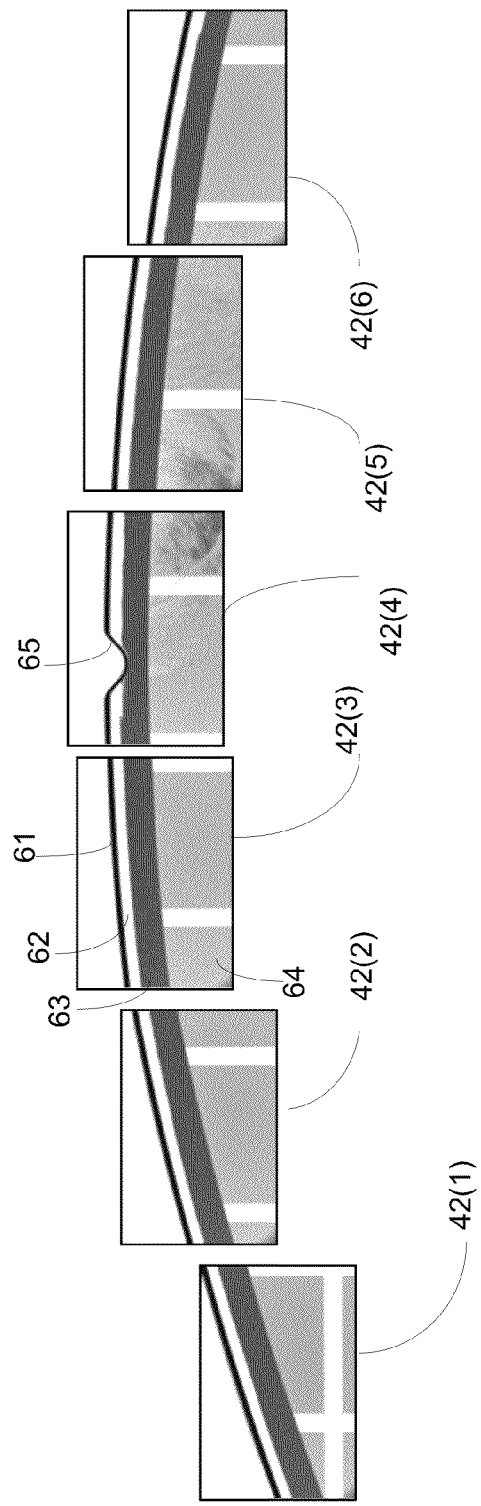
FIG. 6 illustrates multiple wafer area images according to an embodiment of the invention.

FIG. 6 illustrates multiple wafer edge area images 42(1)-42(6) according to an embodiment of the invention.

These wafer edge area images 42(1)-42(6) do not overlap. Wafer edge area images 42(1)-42(6) illustrate:
i. An edge of the wafer 61,
ii. A white area 62 that corresponds to top bevel surface 22 and to a portion of upper surface 24 that is not covered by layers 28 and 29,
iii. A gray area 63 that corresponds to layer 28, and
iv. A patterned area 64 that corresponds to layer 29.
v. Notch 65.

Figure 7:
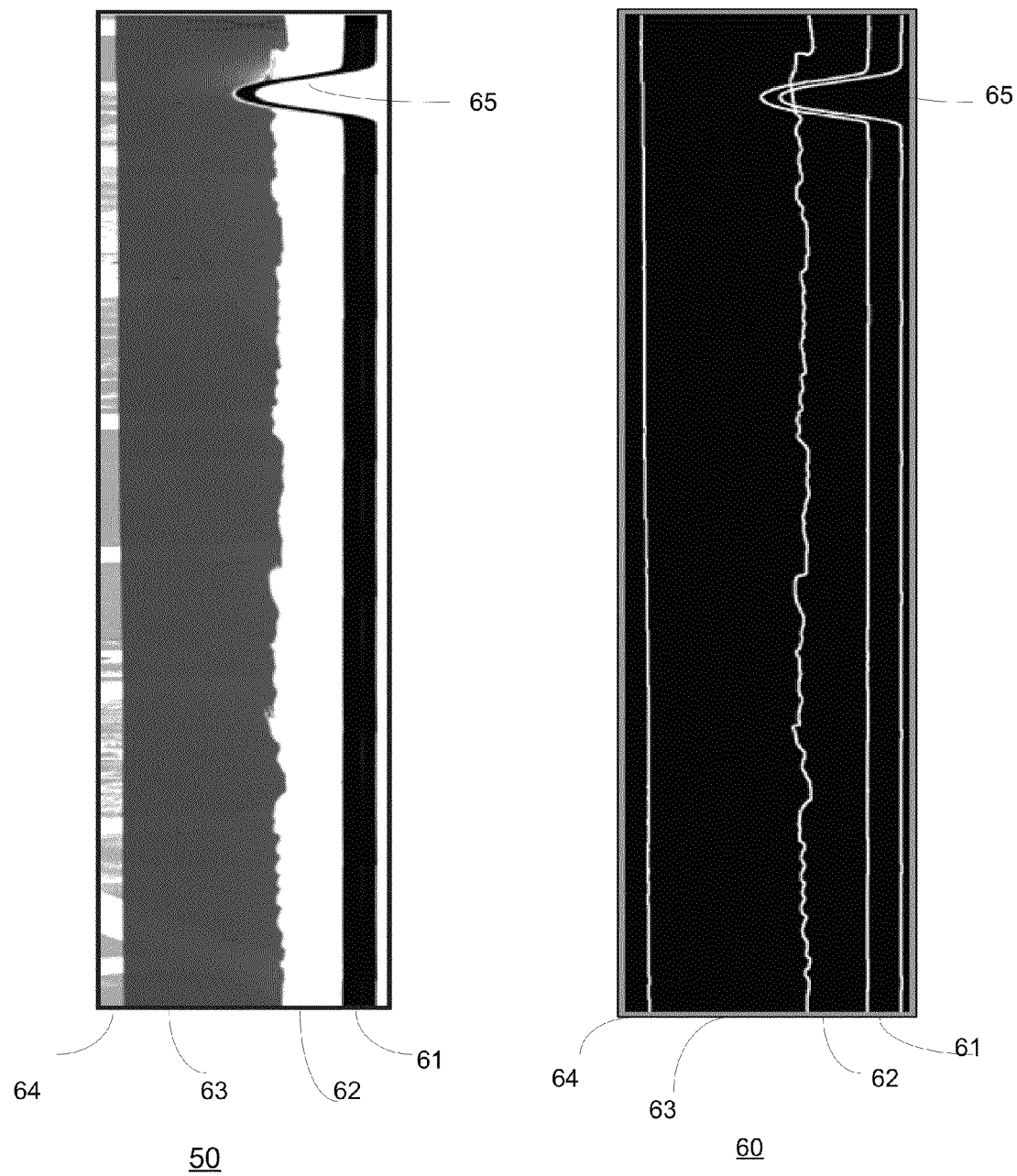
FIG. 7 illustrates a synthetic wafer edge image and an edge image according to an embodiment of the invention.

Areas 61-64 and notch 65 are also illustrated in synthetic wafer edge image 50 of FIG. 7 and in edge image 60 of FIG. 7. The edge image 60 represents edges in the synthetic edge image 50.

The wafer edge area images 42 can be processed to provide a single synthetic wafer edge image such as the synthetic wafer edge image 50 of FIG. 7. The synthetic wafer edge image 50 is generated by removing overlap areas from the wafer edge area images 42 and performing a non-linear transformation of these wafer edge area images 42 such as to convert the substantially circular wafer edge to a line 51. The non-linear transformation can convert the polar coordinates of the wafer edge area images 32 to Cartesian coordinates.

The wafer edge area images 42 or the synthetic wafer edge image 50 can be processed to detect the edge of each layer, to detect areas of interest (such as layers) and to determine the processing algorithms to be applied on each area of interest.

The processing of the wafer edge area images can generate wafer edge layers geometric data (an edge strip image) to be used (but not limited) as dynamic layers zoning (for defining areas of interest).

Wafer Edge Layers Geometric Data Extraction

Figure 8:
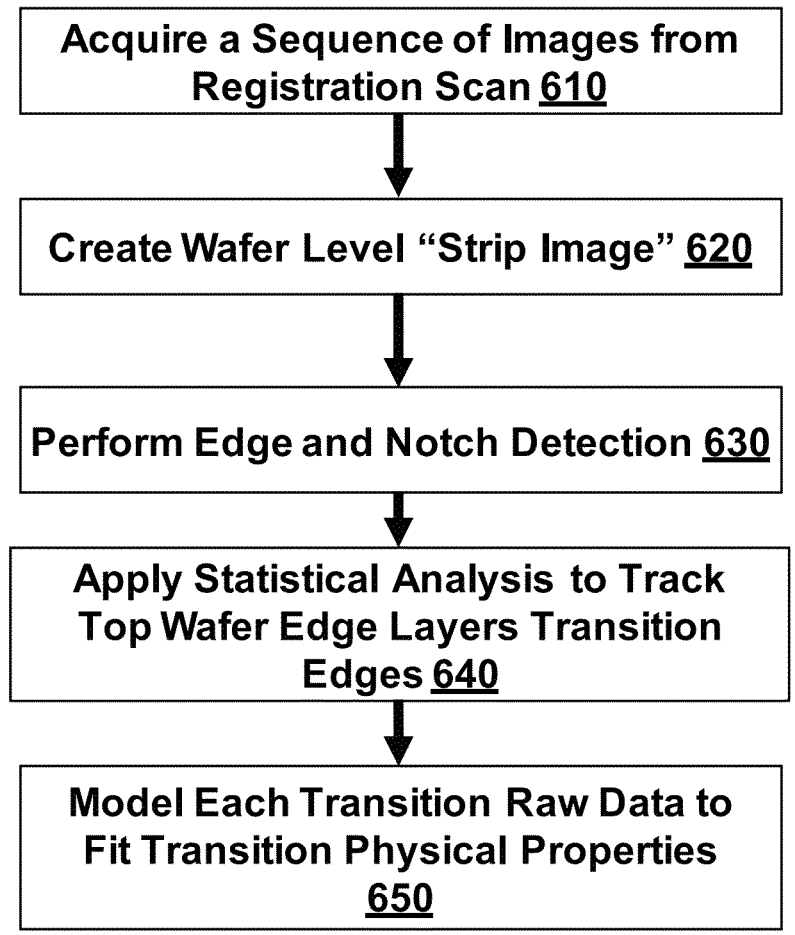
FIG. 8 illustrates a method according to an embodiment of the invention.

The schematic description of geometric data extraction is shown on FIG. 8. The edge strip (wafer edge image 50) may be created using dynamic, configurable wafer level sampling, simple geometric transformations and image mosaic creation.

The edges of the different wafer layers can be detected using various edge detection algorithms. For example, it may include by using a multi-scale modeling approach wherein the edge characteristics are discovered and analyzed at different scales in several geometric dimensions separately or combined, including but not limited to the radial and tangential dimensions. The edge analysis information can be transferred and used between scales.

Different scales mean different size pixels. Thus, if a first image is acquired with a certain resolution (for example N×M pixels), it is converted to images of lower resolution—for example—it may be converted to a second image of N/2×M/2 pixels, to a third image of N/4×M/4 pixels images and other lower resolution images.

The scaling may include averaging (or otherwise merging) pixels of a higher resolution image to provide a lower resolution image.

Thus, a first image of 1000×1000 pixels may be converted to a second image of 500×500 pixels by averaging or otherwise merging each four pixels of the first image to a single pixel of the second image.

FIG. 8 illustrates a method 600 according to an embodiment of the invention.

Method 600 includes a sequence of stages 610-660. Stage 660 can be followed by stage 630. Different iterations of stages 630-660 can be executed on images of different resolution (different scale).

Stage 610 includes acquiring a sequence of images from the registration scan. These images are referred to as wafer edge area images.

Stage 620 includes creating a wafer level "strip image" such as the synthetic wafer edge image 50. The synthetic wafer edge image 50 includes images of the entire edge of the wafer or portion thereof. The synthetic wafer edge image 50 can be a highest resolution image—in the sense that the scale level images generated from the synthetic wafer edge image 50 are of a lower resolution.

Stage 630 includes creating a scale level image. During the first iteration of stages 630-660 the scale level image can be the lowest resolution image having the largest pixels. This is not necessarily so and it can be the highest resolution image or an image of an intermediate resolution.

Stage 640 includes performing at least one of edge detection and either notch or flat detection.

Stage 650 includes applying analysis to track top wafer edge layers transition edges (also referred to as edges or transitions). Stage 650 can include detecting edges of layers such as layers 28 and 29 or any other layer that belongs to the wafer and is viewable by the camera.

Stage 660 includes modeling each transition's raw data to fit transition physical properties. Stage 660 may include determining areas of interest and associating processing algorithms to each area of interest. These processing algorithms may be inspection algorithms, verification algorithms, metrology algorithms and the like. The processing algorithms may be tailored to the different layers—to their materials, their expected structure and the like. Non-limiting examples of algorithms may include algorithms for uniform surfaces, for patterned surfaces, for finding certain shapes and the like.

Stage 660 is followed by either selecting a new scale level (a new resolution) and jumping to stage 630 or ending the process.

The edge detection of stage 630 can be executed during each iteration of stages 630-660 while using information obtained from previous iterations. An edge can detected based on outputs of edge detection attempts executed during different iterations of stage 630.

According to an embodiment of the invention stage 630 may include:
i. Iterative application of edge driven cross bilateral filtering combined with grayscale morphologic operators.
ii. Application of differential operators including but not limited to convolution kernel operations and morphologic derivatives.
iii. Extraction of the edges vector data including configurable segmentation of continues edges according to edge directional information, fluctuation severity and intersections.
iv. Merging broken edge segments into a combined edge segment including polar interpolation and extrapolation in the gap areas.
v. Statistical analysis and modeling comprises noise and outliers filtering proprietary methods and algorithms. This may include a customized form of randomized Hough transform, with culling of low probability outliers. Gap areas between segments are interpolated using polar interpolation based on the emerging circular\elliptic solution.

Wafer Inspection and Metrology Scenario—Run Time

Figure 9:
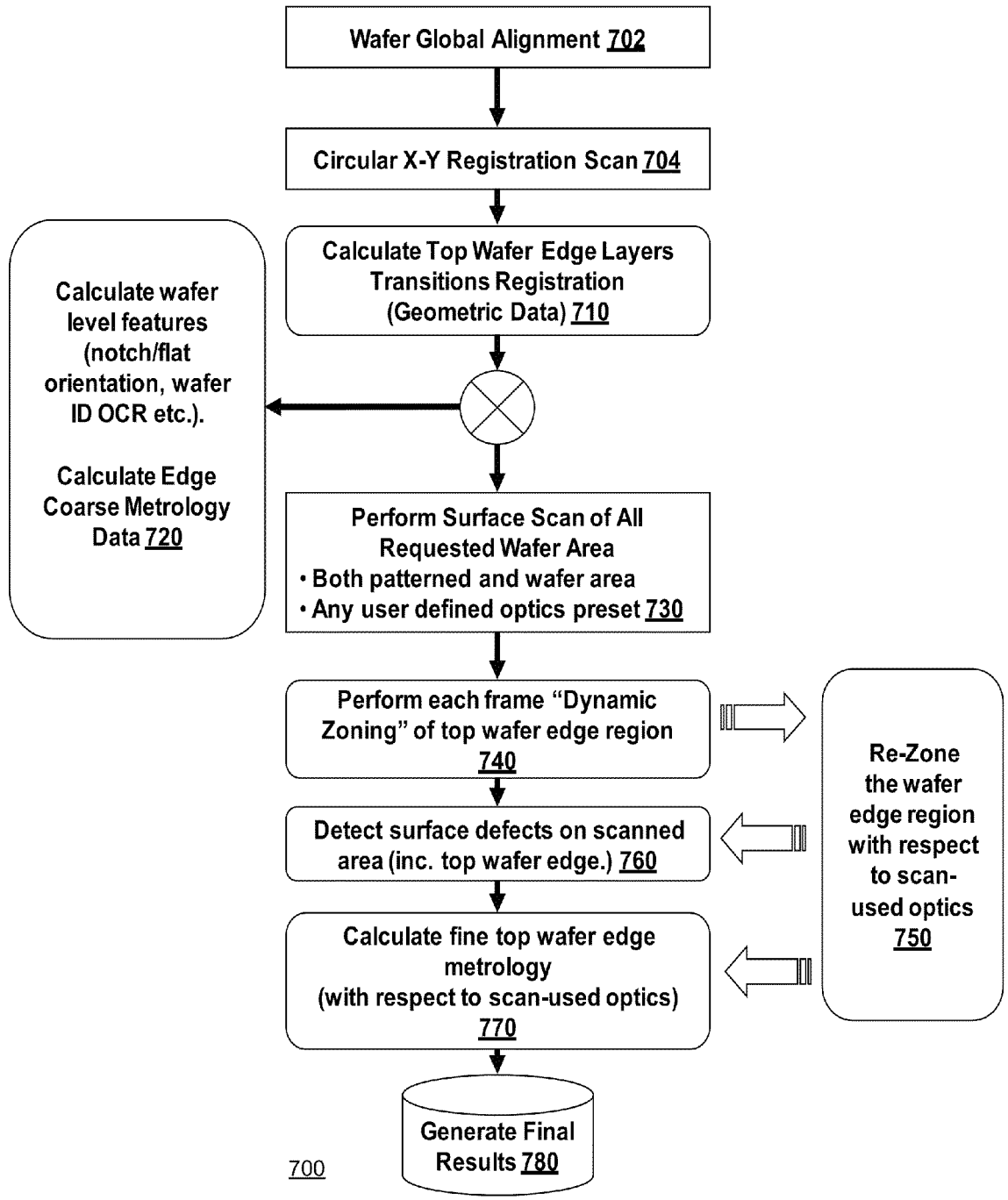
FIG. 9 illustrates a method according to an embodiment of the invention.

FIG. 9 illustrates a method 700 according to an embodiment of the invention.

Method 700 includes stages 702, 704, 710, 720, 730, 740, 750, 760, 770 and 780.

Method 700 can provide a wafer inspection and metrology run-time flow scenario in a presence of a top wafer edge inspection feature. Method 700 includes imaging both wafer edge areas and wafer non-edge areas.

The wafer edge area inspection may be implemented as a part of general wafer surface scan, with an addition of circular X-Y registration scan that is required for wafer edge zoning.

Stage 702 includes performing a global wafer alignment.

Stage 702 is followed by stage 704.

Stage 704 includes performing a registration scan (also referred to as circular X-Y registration scan)—that includes obtaining images of wafer edge areas by using an X-Y stage.

Stage 740 is followed by stage 710.

Stage 710 includes calculating top wafer edge layers and performing transitions registration. This stage includes finding edges of the wafer and edges (transitions) of layers that are proximate to the edge of the wafer.

Stage 710 is followed by stage 720 and 730.

Stage 720 includes calculating wafer level features such as location of notch or flat, wafer orientation, wafer identifier (found by applying Optical Character Recognition—OCR).

Stage 730 includes acquiring images of the entire wafer or of at least wafer edge area and wafer non-edge areas. Stage 730 may include performing a surface scan of all required wafer areas—for example of patterned areas and, additionally un-patterned areas. These images can be obtained by any optical configuration—especially those that use the same camera (or cameras) to obtain images of wafer edges areas and other wafer areas.

Stage 730 may include acquiring images while scanning the wafer by a raster scan pattern or other non-circular pattern.

Figure 12:
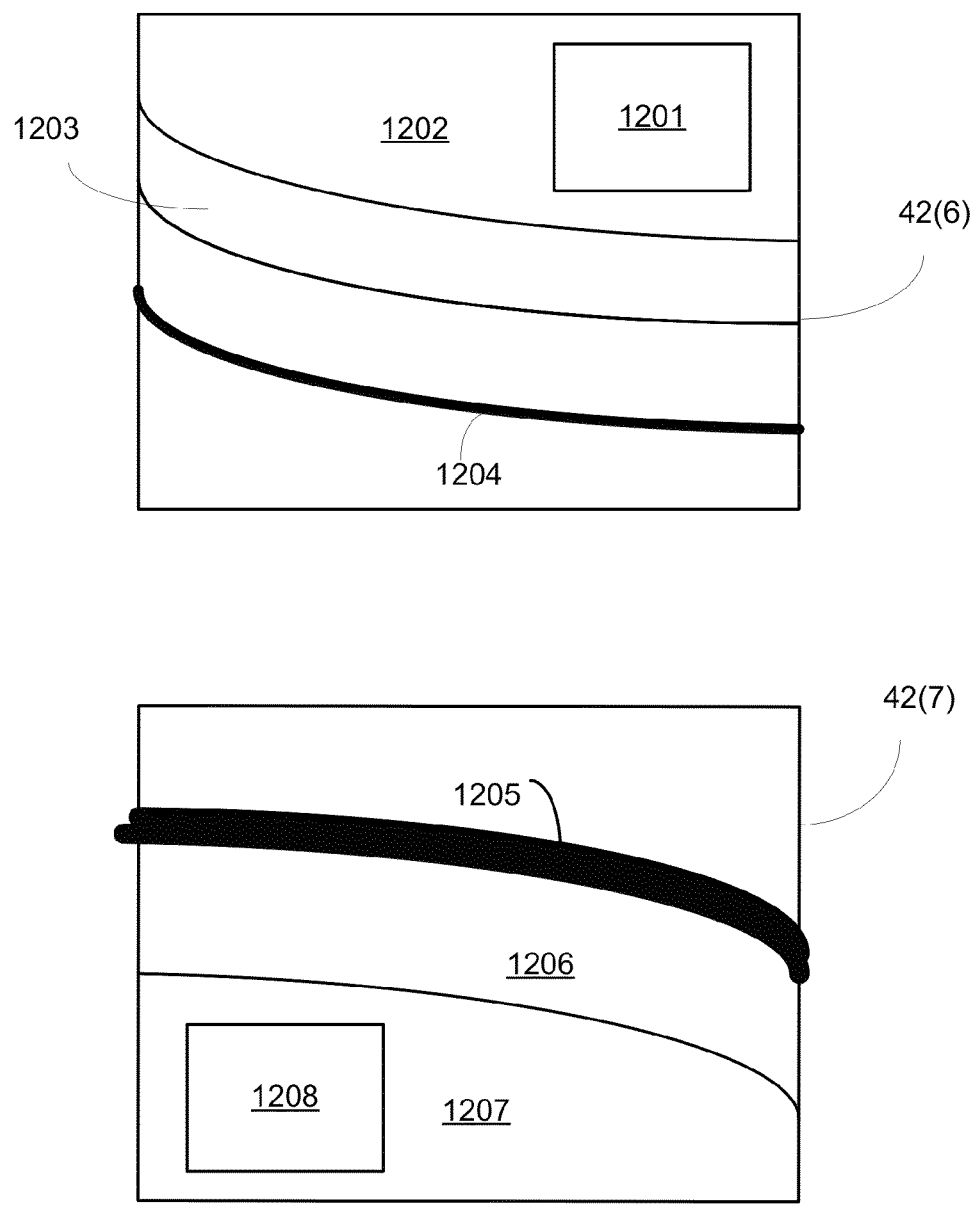
FIG. 12 illustrates a raster scan pattern according to an embodiment of the invention.

FIG. 12 illustrates a raster scan pattern 1200 during which wafer edge area images 42 and wafer non-edge area images 44 are obtained. It is noted that wafer non-edge area images can be obtained by using other scan patterns.

Stage 730 is followed by stage 740.

Stage 740 includes performing "dynamic zoning" on top wafer edge areas. The top wafer edge area is referred to "top" in the sense that is it not includes in the backplane or lower layers of the wafer. Dynamic zoning includes defining areas of interest that will be processed by various processing algorithms. The areas of interest may include the entire area defined between edges or portions thereof.

Figure 13:
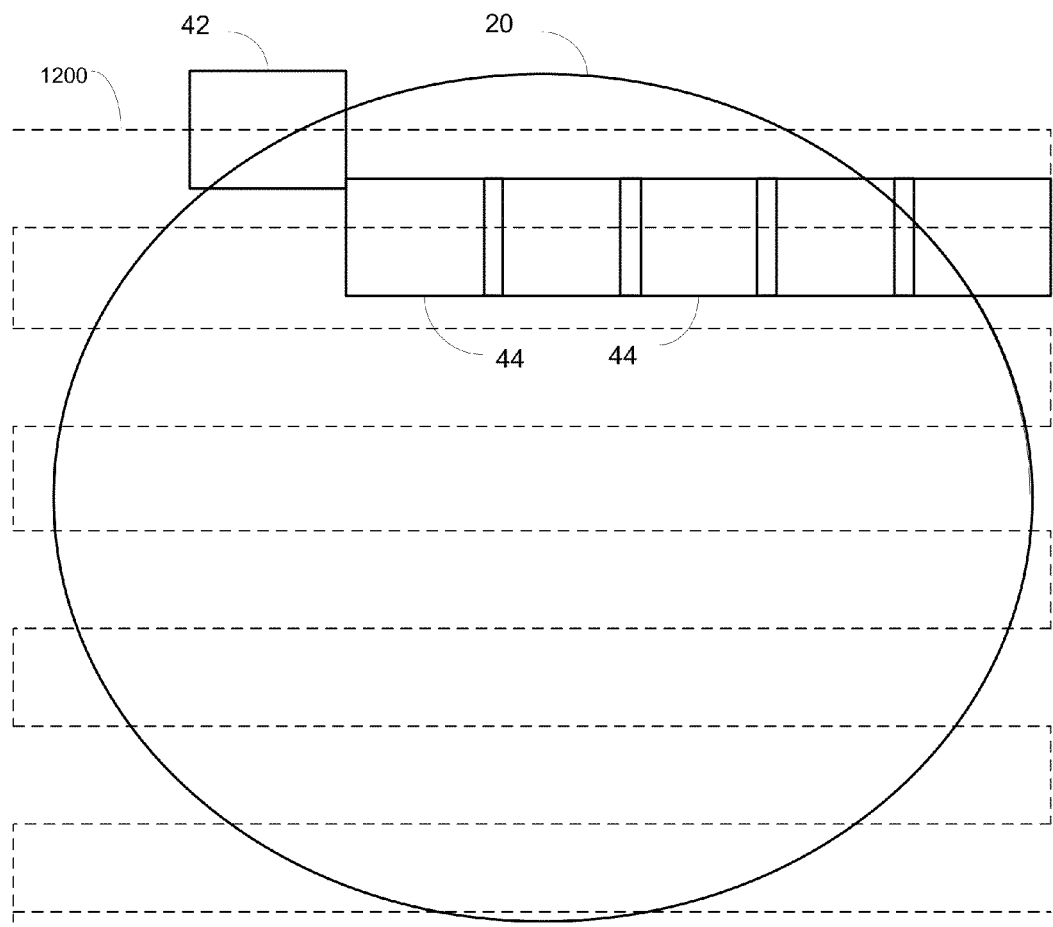
FIG. 13 illustrates various areas of interest according to various embodiments of the invention.

FIG. 13 illustrates various areas of interest according to various embodiments of the invention. Wafer edge image 42(6) includes an area 1202 that corresponds to layer 29, an area 1203 that corresponds to upper bevel area and wafer edge area 1204. Each area out of areas 1202, 1203 and 1204 may be defined an area of interest. A portion of these areas can also be defined as an area of interest—as illustrated by area of interest 1201. Yet for another example—an area of interest may be defined to be placed at a predefined distance (or small distance range) from the detected edges.

Wafer edge image 42(7) includes an area 1207 that corresponds to layer 29, an area 1206 that corresponds to upper bevel area and wafer edge area 1205. Each area out of areas 1205, 1206 and 1207 may be an area of interest. A portion of these areas can also be defined as an area of interest—as illustrated by area of interest 1208. Yet for another example—an area of interest may be defined to be placed at a predefined distance (or small distance range) from the detected edges.

Referring back to FIG. 9—stage 740 may include at least one of:

i. Receiving an image (frame) and image meta-data, the image can be acquired by a standard area camera (that is used for imaging non-wafer edge areas), the wafer edge area images acquisition can be an extension of standard wafer areas can sequence.

ii. Calculating wafer edge area geometric data in the acquired image based on the data coming from previously performed registration scan.

iii. Updating the areas of interest in the image with respect to previous calculation. For example—if a frame includes a part of a layer (or a wafer layer edge) then locations of the areas of interest can be updated and reported to various processing algorithms.

iv. Updating wafer level masking\zoning areas, including but not limited to notch area and wafer identification areas. This may include ignoring areas ("don't care" mask) or applying some other wafer level processing that may be defined by manually defined wafer level mask such as OCR.

Stage 740 is followed by stages 750 and 760.

Stage 750 includes re-zoning the wafer edge area with respect to scan-used optics. This may include re-finding (or re-defining) the locations of wafer layer edges based on higher magnification (higher resolution) images.

Stage 750 is followed by stages 760 and 770.

Stage 760 includes detecting surface defects on scanned area. Stage 760 includes applying one or more processing algorithms on one or more areas of interest to detect defects.

Stage 760 is followed by stage 770.

Stage 770 includes calculating fine top wafer edge metrology. The calculating can be responsive to more accurate information that can be obtained during stage 750.

Stage 770 is followed by stage 780.

Stage 780 includes generating final results such as but not limited to surface defects, distance between wafer layer edges, eccentricity of wafer layer edge relative to a center of the wafer, fluctuation of the wafer layer edge (also referred to as wafer layer transition) across the wafer or any other measureable or calculated properly of the wafer layer edge.

Wafer Inspection and Metrology Scenario—Setup

Figure 10:
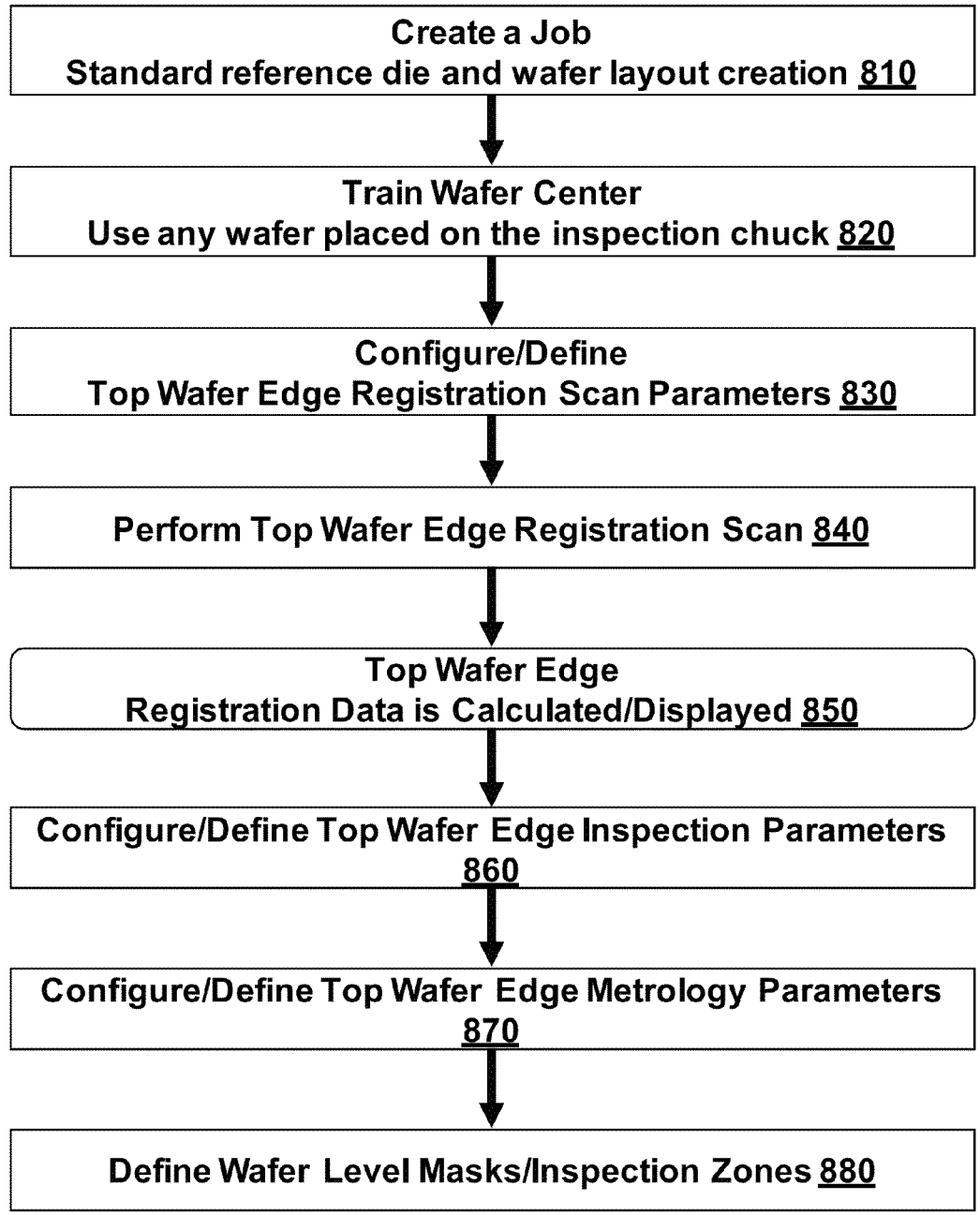
FIG. 10 illustrates a method according to an embodiment of the invention.

FIG. 10 illustrates method 800 according to an embodiment of the invention. Method 800 can provide wafer an inspection and metrology setup in the presence of wafer edge area feature.

Method 800 includes a sequence of stages 810, 820, 830, 840, 850, 860, 870 and 880.

Method 800 starts by stage 810 of creating a job. This may include defining standard reference die and wafer layout creation.

Stage 810 is followed by stage 820 of training a wafer center. This may include determining (either in an accurate manner or by a gross estimation) the location of the center of the wafer.

Stage 820 is followed by stage 830 of configuring or defining registration scan parameters such as but not limited to optical resolution, size of image, overlap between images, scan duration, and the like. There may be provided a trade off between the duration of the registration scan (shorter duration will increase overall throughput) and between the accuracy of the images acquired.

Stage 830 is followed by stage 840 of performing an edge registration scan.

Stage 840 is followed by stage 850 of calculating and, additionally displaying top wafer edge registration data.

Stage 850 can include at least one of: (i) detecting the edge of the wafer, (ii) detecting edges of other top layers of the wafer, (iii) displaying the edge of the wafer, (iv) displaying wafer edge areas, (v) displaying edges of other top layers of the wafer, (vi) displaying a synthetic wafer edge image 50, (vii) displaying an edge image 60.

Stage 850 is followed by stage 860 of configuring or defining top wafer edge inspection parameters.

Stage 860 is followed by stage 870 of configuring or defining top wafer edge metrology parameters.

Stage 870 is followed by stage 880 of defining or receiving areas of interest (defining wafer level masks or inspection zones). Stage 880 can include defining areas of interest and selecting the inspection processing algorithms and metrology processing algorithms to be applied on the areas of interest.

Figure 11:
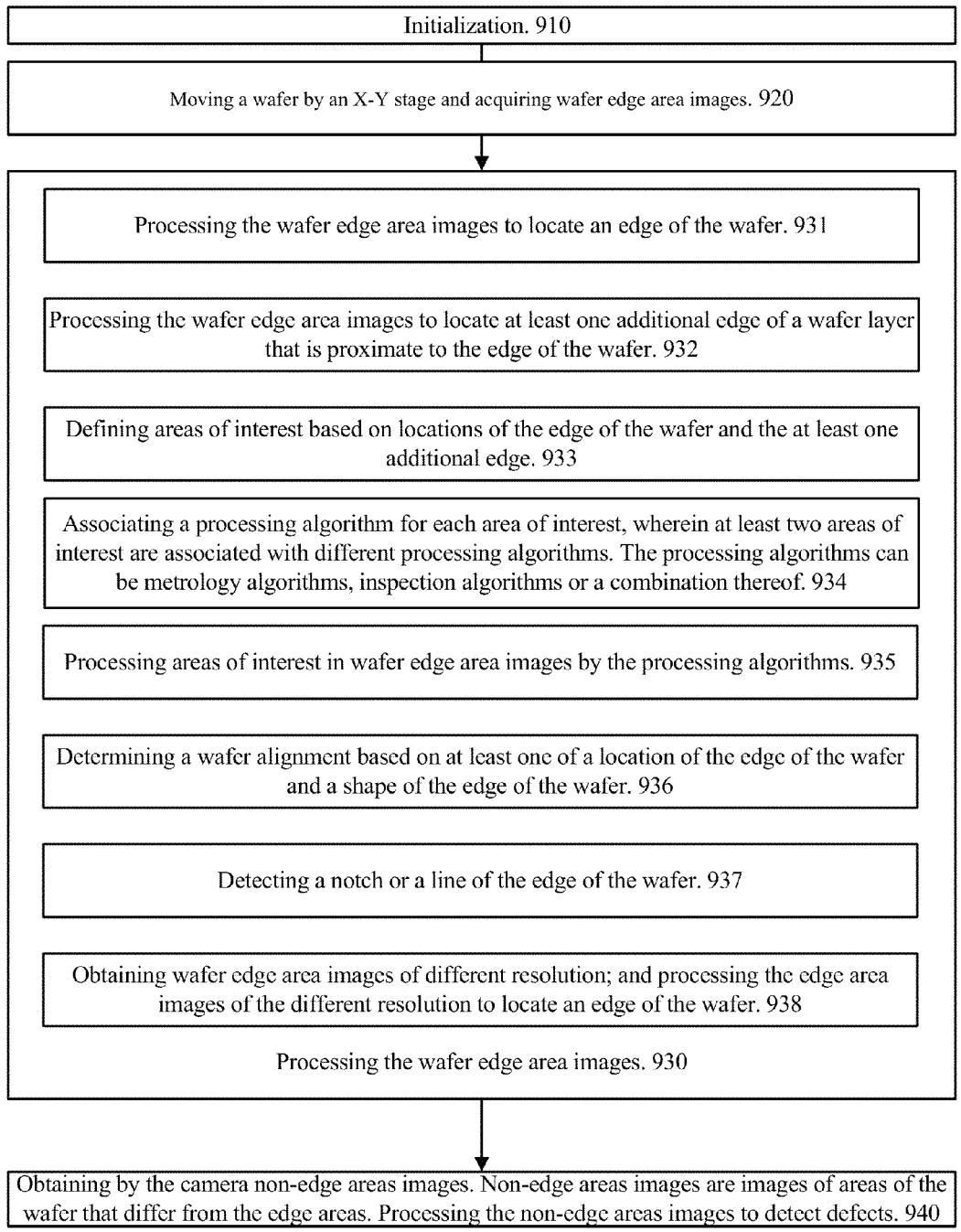
FIG. 11 illustrates a method according to an embodiment of the invention.

FIG. 11 illustrates method 900 for inspecting an edge of a wafer, according to an embodiment of the invention.

Method 900 starts by initialization stage 910.

Stage 910 may include placing the wafer on a chuck that includes one or more reflective elements. A reflective element may be positioned such that an inner portion of the reflective element is concealed by at least the edge of the wafer and an outer portion of the reflective element is non-concealed by the wafer. The reflective element may be a mirror. Alternatively, stage 910 may include placing a wafer on a chuck that does not include reflective elements or any other chuck that differs from chuck 30.

Stage 910 is followed by stage 920 of introducing linear movements of at least one of a camera and the wafer and acquiring wafer edge area images. This may include using an X-Y stage or any other stage.

Stage 930 includes processing the wafer edge area images.

Stage 930 may include at least one of the following stages 931-938.

Stage 931 may include processing the wafer edge area images to locate an edge of the wafer.

Stage 932 may include processing the wafer edge area images to locate at least one additional edge of a wafer layer that is proximate to the edge of the wafer.

Stage 933 may include defining areas of interest based on locations of the edge of the wafer and the at least one additional edge.

Stage 934 may include associating a processing algorithm for each area of interest, wherein at least two areas of interest are associated with different processing algorithms. The processing algorithms can be metrology algorithms, inspection algorithms or a combination thereof.

Stage 935 may include processing areas of interest in wafer edge area images by the processing algorithms.

Stage 936 may include determining a wafer alignment based on at least one of a location of the edge of the wafer and a shape of the edge of the wafer.

Stage 937 may include detecting a notch or a line of the edge of the wafer.

Stage 938 may include obtaining wafer edge area images of different resolution; and processing the edge area images of the different resolution to locate an edge of the wafer.

Method 900 may include stage 940 of obtaining by the camera non-edge areas images of areas of the wafer that differ from the edge areas; and processing the non-edge areas images to detect defects.

Figure 14:
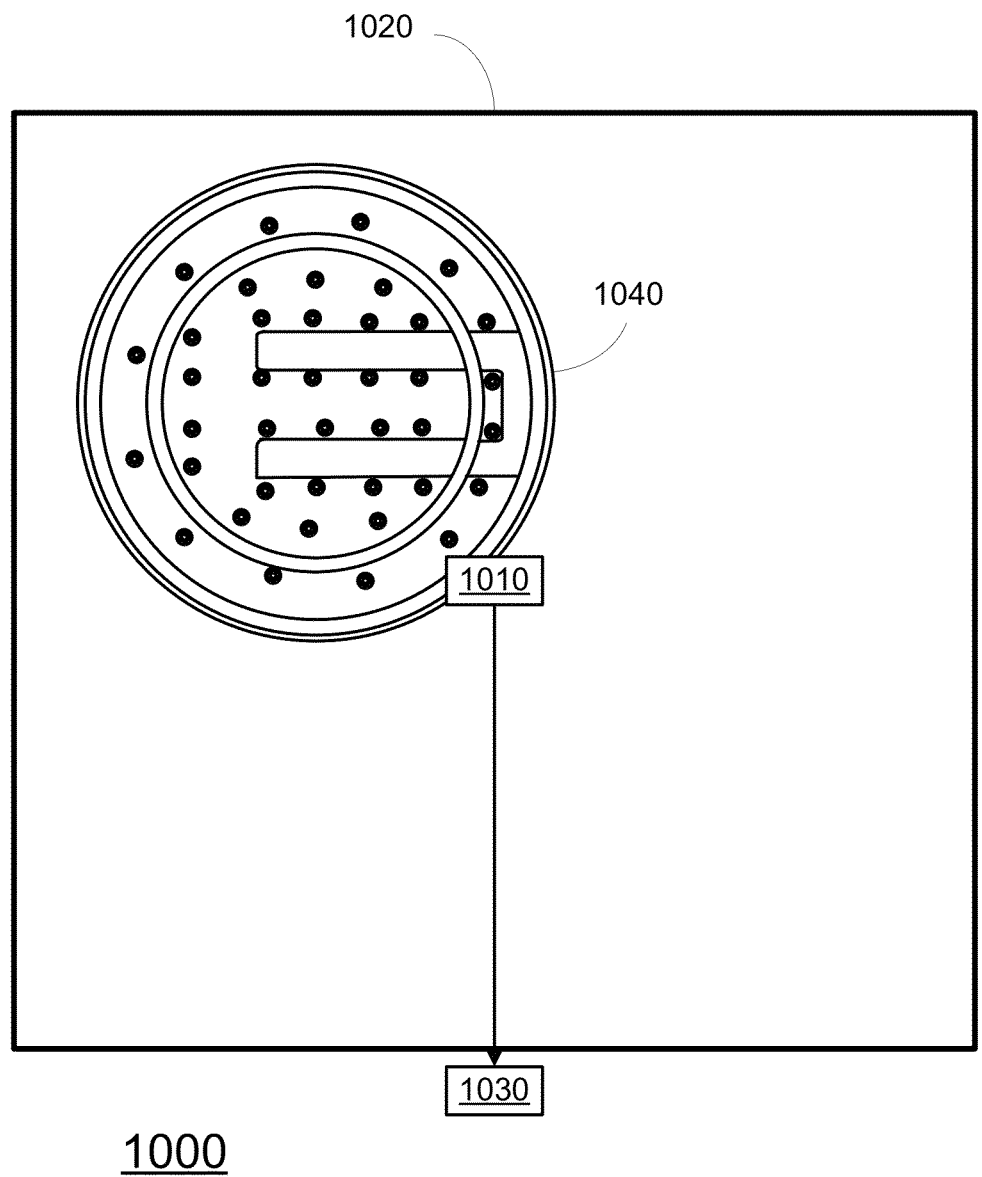
FIG. 14 illustrates a system according to an embodiment of the invention.

FIG. 14 illustrates a system 1000 according to an embodiment of the invention.

System 1000 includes chuck 1040, camera 1010, X-Y stage 1020 and processor 1030.

Chuck 1040 can be the same as chuck 30 or otherwise include one or more reflective elements that provide a sharp contrast to the edge of the wafer. One or more of the reflective elements may be positioned such that an inner portion of the reflective element is concealed by at least the edge of the wafer and an outer portion of the reflective element is non-concealed by the wafer. The reflective element may be a mirror.

X-Y stage 1020 can introduce linear movements between the wafer (supported by chuck 1040) and the camera 1010. It is noted that the X-Y stage 1020 can include an X-stage and a Y-stage, wherein the X-stage and the Y-stage can be connected to each other or separated from each other. Both the X-stage and the Y-stage can move the chuck. Alternatively, the X-stage and the Y-stage move the camera. Alternatively, one of the X-stage and the Y-stage moves the chuck while the other moves the camera. It is noted that the X-Y stage can perform movements along two axes that are orthogonal to each other but, alternatively, it can perform movements along axes that are not perpendicular to each other.

Camera 1010 is used to acquire wafer edge area images 42 and images of wafer non-edge areas (such as areas that are located within circle 33 of FIG. 5). The entire wafer can be scanned by using, for example, a raster scan pattern As illustrated above, the X-Y stage 1020 can introduce linear movements of at least one of a camera 1010 and a wafer (placed on the chuck 1020) while the camera 1010 acquires wafer edge area images (during, at least, registration scan) and of wafer non-edge areas.

It is noted that wafer edge images can be acquired during registration scan and during another scan—as illustrated, for example, in FIG. 12. It is noted that the registration scan is optional and wafer edge area images can be acquired at the same scan as wafer non-edge areas.

Figure 2:
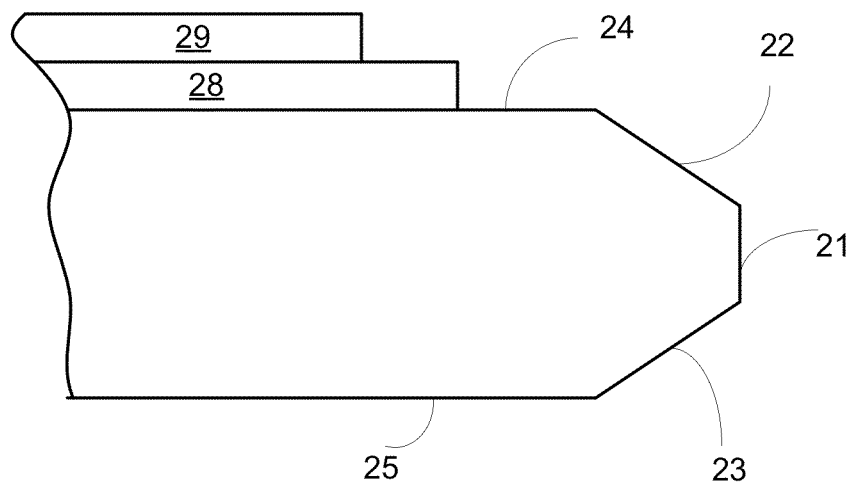
FIG. 2 is a cross sectional view of an edge of a prior art wafer.

Processor 1030 can be arranged to process the wafer edge area images. It can perform at least one of the following:
i. Process the wafer edge area images to locate an edge of the wafer.
ii. Process the wafer edge area images to locate at least one additional edge of a wafer layer that is proximate to the edge of the wafer (such as edges of layers 28 and 29 of FIG. 2).
iii. Defining areas of interest based on locations of the edge of the wafer and the at least one additional edge.
iv. Associate a process algorithm for each area of interest, wherein at least two areas of interest are associated with different process algorithms. The process algorithms can be metrology algorithms, inspection algorithms or a combination thereof.
v. Process areas of interest in wafer edge area images by the process algorithms.
vi. Determine a wafer alignment based on at least one of a location of the edge of the wafer and a shape of the edge of the wafer.
vii. Detect a notch or a line of the edge of the wafer.
viii. Obtaining wafer edge area images of different resolution; and
ix. Process the edge area images of the different resolution to locate an edge of the wafer.
x. Process non-edge areas images.

System 100 can execute any of the mentioned above methods or any combination of stages of these methods.

Any of the mentioned above methods or a combination thereof (of methods or method stages) can be executed by a computer that executed instructions stored in a non-transitory computer readable medium of a computer program product.

It is noted that the order of stage of each method (even if referred to as a sequence of stages) can differ from the order illustrate din the figure and that stages can be executed out of order, in an overlapping or at least partially overlapping manner.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for wafer registration, the method comprises:
   moving a wafer by an X-Y stage and acquiring wafer edge area images;
   processing, by a processor, the wafer edge area images to locate an edge of the wafer; and
   placing the wafer on a chuck that comprises a reflective element that is positioned such that an inner portion of the reflective element is concealed by at least the edge of the wafer and an outer portion of the reflective element is non-concealed by the wafer.

2. The method according to claim 1 wherein the reflective element is a mirror.

3. A method for wafer registration, the method comprises:
   moving a wafer by an X-Y stage and acquiring wafer edge area images; and
   processing, by a processor, the wafer edge area images to locate an edge of the wafer;
   processing the wafer edge area images to locate at least one wafer layer edge that is proximate to the edge of the wafer and differs from the edge of the layer; and
   detecting by the processor at least one of the edge of the wafer and the wafer layer edge by performing at least one out of:
   iterative application of edge driven cross bilateral filtering combined with grayscale morphologic operators; and
   application of differential operators including but not limited to convolution kernel operations and morphologic derivatives.

4. A method for wafer registration, the method comprises:
   moving a wafer by an X-Y stage and acquiring wafer edge area images; and
   processing, by a processor, the wafer edge area images to locate an edge of the wafer;
   processing the wafer edge area images to locate at least one wafer layer edge that is proximate to the edge of the wafer and differs from the edge of the layer; and
   detecting by the processor at least one of the edge of the wafer and the wafer layer edge by performing at least one out of:
   extraction of edges vector data including configurable segmentation of continues edges according to edge directional information, fluctuation severity and intersections; and
   merging broken edge segments into a combined edge segment including polar interpolation and extrapolation in the gap areas.

5. A method for wafer registration, the method comprises:
   moving a wafer by an X-Y stage and acquiring wafer edge area images; and
   processing, by a processor, the wafer edge area images locate an edge of the wafer;
   processing the wafer edge area images to locate at least one wafer layer edge that is proximate to the edge of the wafer and differs from the edge of the layer; and
   detecting by the processor at least one of the edge of the wafer and the wafer layer edge by applying a randomized Hough transform, with culling of low probability outliers;
   and interpolating gap areas between edge segments using a polar interpolation based on the emerging circular\elliptic solution.

6. A system, comprising:
   a camera;
   an X-Y stage for moving a wafer;
   wherein the camera is arranged to acquire wafer edge area images;
   a processor that is arranged to process the wafer edge area images to locate an edge of the wafer; and
   a chuck that comprises a reflective element that is positioned such that an inner portion of the reflective element is concealed by at least the edge of the wafer and an outer portion of the reflective element is non-concealed by the wafer.

7. The system according to claim 6, wherein the reflective element is a mirror.

8. A system, comprising:
   a camera;
   an X-Y stage for moving a wafer;
   wherein the camera is arranged to acquire wafer edge area images;
   a processor that is arranged to process the wafer edge area images to locate an edge of the wafer;
   wherein the processor is arranged to process the wafer edge area images to locate at least one wafer layer edge that is proximate to the edge of the wafer and differs from the edge of the layer;
   wherein the processor is arranged to detect at least one of the edge of the wafer and the wafer layer edge by performing at least one out of:
   iterative application of edge driven cross bilateral filtering combined with grayscale morphologic operators; and
   application of differential operators including but not limited to convolution kernel operations and morphologic derivatives.

9. A system, comprising:
   a camera;
   an X-Y stage for moving a wafer;
   wherein the camera is arranged to acquire wafer edge area images
   a processor that is arranged to process the wafer edge area images to locate an edge of the wafer;
   wherein the processor is arranged to process the wafer edge area images to locate at least one wafer layer edge that is proximate to the edge of the wafer and differs from the edge of the layer;
   wherein the processor is arranged to detect at least one of the edge of the wafer and the wafer layer edge by at least one of:
   extraction of edges vector data including configurable segmentation of continues edges according to edge directional information, fluctuation severity and intersections; and
   merging broken edge segments into a combined edge segment including polar interpolation and extrapolation in the gap areas.

10. A system, comprising:
    a camera;
    an X-Y stage for moving a wafer;
    wherein the camera is arranged to acquire wafer edge area images;
    a processor that is arranged to process the wafer edge area images to locate an edge of the wafer;

wherein the processor is arranged to process the wafer edge area images to locate at least one wafer layered edge that is proximate to the edge of the wafer and differs from the edge of the layer;

wherein the processor is arranged to detect at least one of the edge of the wafer and the wafer layer edge by applying a randomized Hough transform, with culling of low probability outliers; and interpolating gap areas between edge segments using a polar interpolation based on the emerging circular\elliptic solution.

* * * * *